US007445806B2

(12) United States Patent
Shah et al.

(10) Patent No.: US 7,445,806 B2
(45) Date of Patent: Nov. 4, 2008

(54) PROCESS FOR SELECTIVE GRINDING AND RECOVERY OF DUAL-DENSITY FOODS

(75) Inventors: Manoj Shah, Lindenhurst, IL (US); Nicole Remily, Richland, MI (US); Mark J. Ramundo, Waldwick, NJ (US); Kristin G. Neale, Milwaukee, WI (US)

(73) Assignee: Kraft Foods Global Brands LLC, Northfield, IL (US)

( * ) Notice: Subject to any disclaimer, the term of this patent is extended or adjusted under 35 U.S.C. 154(b) by 771 days.

(21) Appl. No.: 10/932,295

(22) Filed: Sep. 2, 2004

(65) Prior Publication Data

US 2006/0045951 A1 Mar. 2, 2006

(51) Int. Cl.
*A23P 1/00* (2006.01)

(52) U.S. Cl. ....................... 426/479; 426/480; 426/481; 426/482; 426/483

(58) Field of Classification Search .......... 426/479–483
See application file for complete search history.

(56) References Cited

U.S. PATENT DOCUMENTS 2,316,207 A 4/1943 Winter
2,958,472 A 11/1960 Erickson et al.
3,462,086 A * 8/1969 Bertrand et al. ................ 241/5
3,678,597 A 7/1972 Stuhlmann et al.
3,734,413 A * 5/1973 Kaiser ......................... 241/39
3,768,172 A 10/1973 Klein et al.
3,821,450 A 6/1974 Stauber
3,840,188 A 10/1974 Coombe et al.
3,964,175 A 6/1976 Sivetz
4,215,151 A 7/1980 Rios et al.
4,390,131 A 6/1983 Pickrel
4,553,704 A 11/1985 Wilson et al.
4,582,264 A 4/1986 Stephanoff et al.
4,602,743 A * 7/1986 Nied ............................ 241/5
4,722,849 A 2/1988 Dartey et al.
4,860,461 A 8/1989 Tamaki et al.
4,875,904 A 10/1989 Munk
4,934,608 A 6/1990 Sylla et al.
4,963,743 A 10/1990 Satake et al.

(Continued)

FOREIGN PATENT DOCUMENTS

EP 0 213 645 A1 3/1987

(Continued)

OTHER PUBLICATIONS

U.S. Appl. No. 10/736,595, filed Dec. 17, 2003, Arora et al.

(Continued)

*Primary Examiner*—Anthony Weier
(74) *Attorney, Agent, or Firm*—Fitch, Even, Tabin & Flannery

(57) ABSTRACT

A process for selectively grinding dual-density processed food in a single unit operation in a short-duration manner. Selective grinding as between lower-density and higher-density portions of the dual-density processed food may be effected without the need for moving mechanical parts. A granulated lower-density portion and liberated nonground higher-density portion obtained from the selective grinding treatment performed on dual-density processed food are independently useful for re-use in food production lines.

28 Claims, 4 Drawing Sheets

U.S. PATENT DOCUMENTS

| | | | | | |
|---|---|---|---|---|---|
| 4,970,804 | A | | 11/1990 | Hüttlin | |
| 4,979,684 | A | * | 12/1990 | Hoch et al. | 241/39 |
| 4,988,590 | A | | 1/1991 | Price et al. | |
| 5,034,609 | A | | 7/1991 | Satake et al. | |
| 5,071,668 | A | | 12/1991 | Van Lengerich et al. | |
| 5,155,923 | A | | 10/1992 | Wireman et al. | |
| 5,223,292 | A | | 6/1993 | Thulin et al. | |
| 5,230,281 | A | | 7/1993 | Wireman et al. | |
| 5,236,132 | A | | 8/1993 | Rowley, Jr. | |
| 5,257,574 | A | | 11/1993 | Hiromichi | |
| 5,292,005 | A | | 3/1994 | Wireman et al. | |
| 5,394,623 | A | | 3/1995 | Sewell | |
| 5,423,132 | A | | 6/1995 | Graber | |
| 5,436,023 | A | | 7/1995 | Avera | |
| 5,567,048 | A | | 10/1996 | Hammonds | |
| 5,577,467 | A | | 11/1996 | Bormann | |
| 5,598,979 | A | | 2/1997 | Rowley, Jr. | |
| 5,604,994 | A | | 2/1997 | Annen et al. | |
| 5,609,097 | A | | 2/1997 | Newnan | |
| 5,616,356 | A | | 4/1997 | Buhler et al. | |
| 5,620,145 | A | | 4/1997 | Masuda | |
| 5,718,164 | A | | 2/1998 | Finken et al. | |
| 5,725,898 | A | | 3/1998 | Murphy et al. | |
| 5,791,066 | A | | 8/1998 | Crews | |
| 5,853,788 | A | | 12/1998 | Murphy et al. | |
| 5,855,326 | A | | 1/1999 | Beliavsky | |
| 5,899,391 | A | | 5/1999 | Goehner et al. | |
| 5,915,814 | A | | 6/1999 | Crews | |
| 5,958,494 | A | | 9/1999 | Tidland et al. | |
| 5,984,212 | A | | 11/1999 | Andreae-Jäckering | |
| 6,135,370 | A | | 10/2000 | Arnold | |
| 6,145,765 | A | * | 11/2000 | Capelle et al. | 241/5 |
| 6,207,211 | B1 | | 3/2001 | Wasserman et al. | |
| 6,227,473 | B1 | | 5/2001 | Arnold | |
| 6,260,479 | B1 | | 7/2001 | Friedrich et al. | |
| 6,270,708 | B1 | | 8/2001 | Gurol | |
| 6,395,051 | B1 | | 5/2002 | Arnold et al. | |
| 6,405,948 | B1 | | 6/2002 | Hahn et al. | |
| 6,517,015 | B2 | | 2/2003 | Rowley, Jr. | |
| 6,530,534 | B1 | | 3/2003 | Farmer | |
| 6,564,470 | B2 | | 5/2003 | Krueger | |
| 6,607,768 | B1 | | 8/2003 | Eichner | |
| 7,156,331 | B2 | * | 1/2007 | Takahashi et al. | 241/39 |
| 2002/0027173 | A1 | | 3/2002 | Polifka | |
| 2002/0046475 | A1 | | 4/2002 | Cho et al. | |
| 2003/0080224 | A1 | | 5/2003 | Rowley, Jr. | |

FOREIGN PATENT DOCUMENTS

| | | | | |
|---|---|---|---|---|
| EP | 0 787 528 | B1 | | 7/1999 |
| EP | 1 136 129 | A1 | | 9/2001 |
| JP | 59-71660 | | * | 4/1984 |
| WO | WO 98/51413 | | | 4/1998 |
| WO | WO 01/21316 | A1 | | 3/2001 |
| WO | WO 03/006166 | A1 | | 1/2003 |

OTHER PUBLICATIONS

U.S. Appl. No. 10/912,560, filed Aug. 6, 2004, Shah et al.
U.S. Appl. No. 10/919,518, filed Aug. 17, 2004, Shah et al.
U.S. Appl. No. 10/963,746, filed Oct. 14, 2004, Shah et al.
U.S. Appl. No. 10/972,089, filed Oct. 25, 2004, Shah et al.
Huslin, A., "A Mighty Wind Against Waste," washingtonpost.com (Monday, Dec. 9, 2002, p. A01), a printout of: http://www.washingtonpost.com/ac2/wp-dyn?pagename=article&node=&contentID=A28285-2002Dec8&notFound=true, 6 pages, Feb. 16, 2004.
Lewis, S., "Kansas Chicken Twisters," Engineers' Forum of Virginia Tech, a printout of: http://filebox.vt.edu/eng/forum/issue_archive/2003_2_april/12_chicken_twisters.htm, 2 pages, Nov. 13, 2003.
Garofalo, F., Wichita Eagle Newspaper Article, 1 page, undated.
Ichiu, K., Method For Roasting and Pulverizing Coffee Bean and Apparatus Therefor, Patent Abstracts of Japan, Publication No. 03219837 A, Sep. 27, 1991, 1 page, JPO&Japio.
Sadakatsu, S., Apparatus For Roasting and Grinding Coffee Bean, Patent Abstracts of Japan, Publication No. 03266965 A, Nov. 27, 1991, 1 page, JPO&Japio.
Sadakatsu, S., Roaster For Coffee Bean, Patent Abstracts of Japan, Publication No. 03266966 A, Nov. 27, 1991, 1 page, JPO&Japio.
Sadakatsu, S., Coffee Bean-Roasting and Milling Device, Patent Abstracts of Japan, Publication No. 04304872 A, Oct. 28, 1992, 1 page, JPO&Japio.
Haruyoshi, O., Vortex Grinding and Vortex Grinding Device, Patent Abstracts of Japan, Publication No. 05277927 A, Oct. 26, 1993, 1 page, JPO&Japio.

* cited by examiner

PROCESS FOR SELECTIVE GRINDING AND RECOVERY OF DUAL-DENSITY FOODS

FIELD OF THE INVENTION

The invention generally relates to a process for recovering components of dual-density processed foods for re-use in food manufacture.

BACKGROUND OF THE INVENTION

In the production of many types of food products, some unused wet processed food portions are sometimes left as trimmings, shreds, offcuts, fragments, and so forth, after a batch run or other production run. Also, small quantities of processed food product that may not conform to a desired shape or configuration may be rejected and not used in a commercial product. Ideally, such small quantities are combined with larger quantities for use as rework in subsequent food production. This often requires heating, mechanical grinding, milling or other processing steps to reform the processed food into a more convenient or stable form, which can lead to difficulties.

Dual-density baked goods, such as cookies, which contain chocolate pieces distributed in a base cake, are difficult to rework for re-use. Conventional mechanical milling or grinding procedures will indiscriminately grind the entire material. Mechanical grinding tends to generate heat in the material, which may melt chocolate pieces or similar heat-sensitive components dispersed within the baked goods. Ideally, to reclaim diverse components of cookie productions, for instance, the base cake would be separated from the chocolate pieces distributed therein and converted into a shelf-stable, re-usable dough ingredient retaining flavor and texture while the chocolate pieces separately would be recovered in a substantially physically intact, non-melted form for re-use.

Arrangements are needed for recovering diverse components of dual-density processed foods at a high recovery rate in a shelf-stable, food grade, functional form for re-use. The invention addresses the above and other needs in an efficient and economically feasible manner.

SUMMARY OF THE INVENTION

This invention provides a process for selectively grinding dual-density processed foods into re-usable food grade, functional forms. The selective grinding treatment performed on dual-density processed food granulates a lower-density portion and liberates a nonground higher-density portion in a substantially intact form. The reclaimed components are functionally suitable for separate or combined re-use in food production lines.

The selective grinding procedure may be performed in a short duration, single unit operation. This process substantially preserves desirable functional and flavor aspects of diverse components of dual-density processed foods so that they are useful for further food manufacture as individualized ingredients. The selective grinding is performed in a static mechanical structure in which the dual-density processed food is not contacted by moving mechanical parts. Heat development in rework from mechanical treatment is avoided. The selective grinding procedure can be conducted at ambient product and process air temperature conditions, as well as cooled product and/or process air temperature conditions. In some applications, the relative humidity (RH) of process air used may be reduced before introduction into a granulation process unit. Melting or other undesired heat affects on a heat-sensitive flavoring component of a dual-density processed food may be reduced or avoided. Essentially all the diverse components of the dual-density processed food material may be reclaimed for further food grade uses.

In some embodiments, the types of dual-density processed foods that may be reclaimed via selective grinding treatment may comprise a lower-density base cake portion containing a grain-based ingredient, and a higher-density portion comprising chocolate and/or nut pieces dispersed in the base cake. Dual-density processed foods may be selected, for example, from baked good doughs, such as cookies, ready-to-eat (RTE) cereals, or RTE cereal bars, snack mixes, trail mixes, and the like.

In one particular embodiment, the lower-density base cake portion comprises a grain-based ingredient containing farinaceous material, and the base cake portion emerges from the selective grinding treatment in granular form with the farinaceous content substantially intact and substantially without loss of flavor or texture. In this embodiment, the grinding treatment effectively granulates a base cake portion of a dual-density processed foods without inducing significant or uncontrolled starch gelatinization in the base cake portion thereof. Residual starch content of the foods that remains after any prior cooking or other thermal treatments are performed on the processed food is substantially maintained through the selective grinding process, and thus is functionally available for re-use. The reclaimed base cake portion also may be re-used at relatively high levels in further food production lines.

In a particular embodiment, the selective grinding treatment of dual-density processed food is conducted as a procedure in which compressed air at relatively low pressure and dual-density processed food are separately introduced into an enclosure that includes a truncated conical shaped section. In some applications, the relative humidity (RH) of the compressed air preferably is pre-controlled before introduction into the enclosure. For example, if the process air has a relative humidity exceeding about 50%, an air dehumidifier or dryer may be incorporated into the air feeding system to reduce the relative humidity of the process air to a value below 50% before it is fed into the enclosure constituting the granulation process unit. After introduction, the compressed air travels generally along a downward path through the enclosure until it reaches a lower end thereof. The air flows back up from the lower end of the enclosure in a central region thereof until exiting the enclosure via an exhaust duct. The dual-density processed food is separately introduced into an upper end of the enclosure, and the food becomes entrained in the air traveling downward through the enclosure until reaching the lower end of the enclosure.

During this movement of the processed food from the upper end of the enclosure down to the lower end thereof, the lower-density portion of the processed food, e.g., base cake, is physically processed. The lower-density portion of the food is disintegrated into small particles in an extremely short period of time. Significant amounts of the lower-density portion of the introduced dual-density processed food can be selectively ground before reaching a lower end of the enclosure. The higher-density portion of the processed food, e.g., chocolate pieces, is left substantially intact and incurs minimal if any attrition or melting alterations. In an optional further embodiment, the processed food-product may be prefrozen before introduction into the cyclonic processing to further inhibit grinding or melting from occurring with respect to the higher-density portion of the processed food, and particularly for a heat-sensitive higher-density portion, such as chocolate chips.

Consequently, in these embodiments, a solid particulate product including a ground lower-density portion of the food and an unground lower-density portion of the dual-density processed food is discharged and recovered from the lower end of the enclosure, while air and any moisture vapor released from the food during processing within the unit is exhausted from the system via the exhaust duct. In one particular embodiment, the enclosure is a two-part structure including an upper cylindrical shaped enclosure in which the low pressure compressed air and dual-density processed food are separately introduced, and the cylindrical enclosure adjoins and fluidly communicates with a lower enclosure having the truncated conical shape that includes the lower end of the overall structure from which the processed feed material is dispensed.

Grinding dual-density processed foods in accordance with embodiments of this invention offers numerous advantages over conventional schemes for disposal of dual-density processed food. The grinding treatment preferably may be achieved as a single-unit operation without impairing the desirable attributes of the diverse food components of the dual-density processed food material, and without requiring different processes be performed in different equipment. Additionally, the process can be operated in a continuous mode as the compressed air is continuously exhausted from the system after entraining the food downward through the enclosure to its lower end (where an extension shaft may be added to facilitate the separation and discharge of the components in a dual density product), and ground and unground food product material can be withdrawn from the lower end of the enclosure. Costs associated with transporting and disposing of a food material are reduced or eliminated. Relatively little if any food residue is left on the inner walls of the processing unit, making it easy to clean and facilitating switching to different type of processed food for processing within the unit. These advantages reduce process complexity, production time, and production and service costs.

BRIEF DESCRIPTION OF THE DRAWINGS

Other features and advantages of the invention will become apparent from the following detailed description of preferred embodiments of the invention with reference to the drawings, in which.

The features depicted in the figures are not necessarily drawn to scale. Similarly numbered elements in different figures represent similar components unless indicated otherwise.

DETAILED DESCRIPTION OF THE PREFERRED EMBODIMENTS

Preferred embodiments of the invention will be described below with specific reference to unique processing of dual-density processed foods.

Generally, dual-density processed food is subjected to selective grinding such that a lower density portion thereof is milled into a small particle size within a short period of time in a grinding process performed in one unit operation, while a higher-density fragmented portion is left unground. In general, the selective grinding process is implemented on a cyclonic type system that may be operated in a manner whereby the dual-density processed food may be physically acted upon in a selective beneficial manner. A ground food product is obtained from the lower-density portion in a granulated form (e.g., a solid fine particulate).

For purposes herein, "grinding" a particle means crushing, pulverizing, abrading, wearing, or rubbing the particle to break it down into smaller particles and/or liberate smaller particles, and includes mechanisms involving contact between moving particles, and/or between a moving particle and a static surface.

Figure 1:
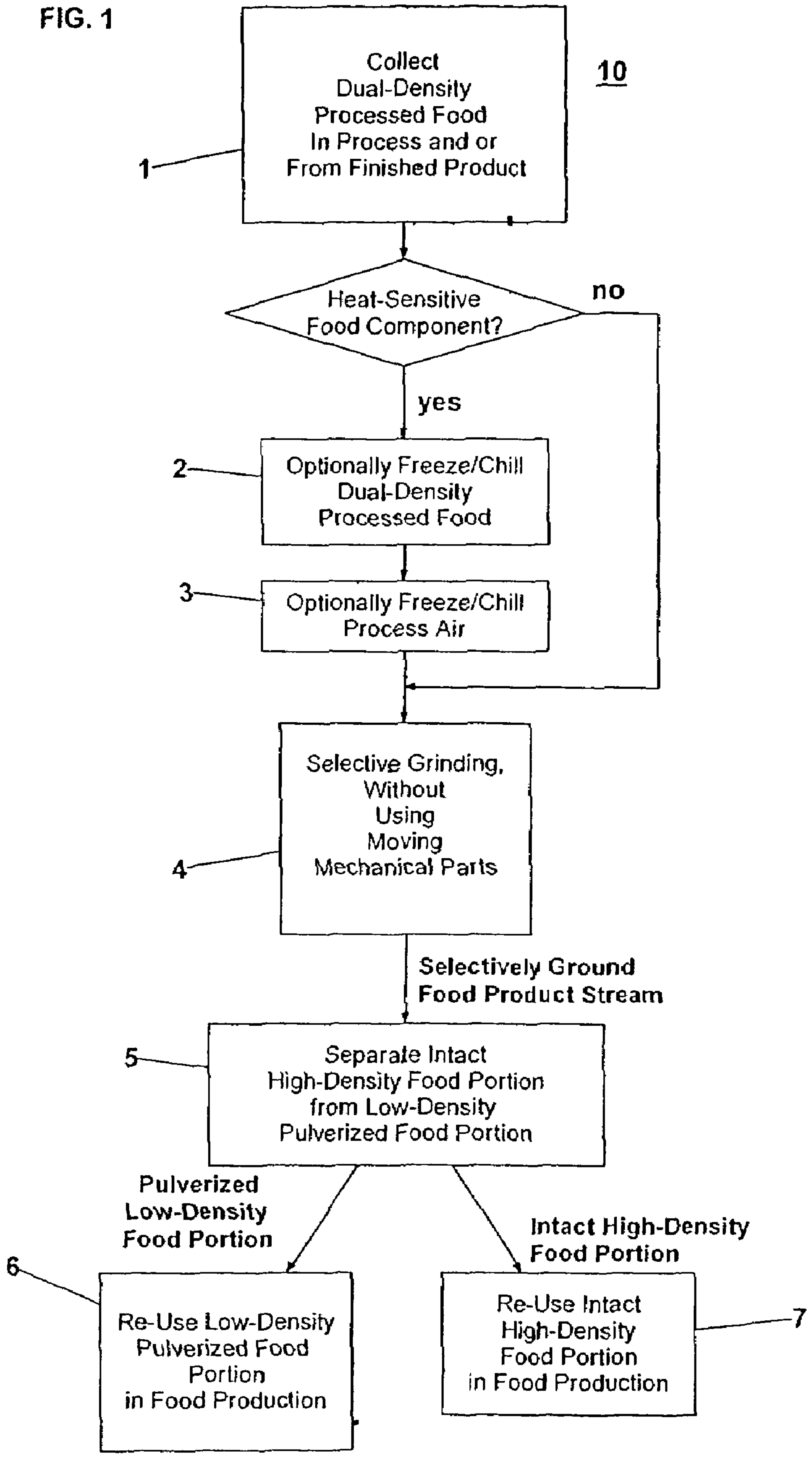
FIG. 1 is a flow chart of a method for processing and re-using dual-density processed food according to an embodiment of this invention.

Referring to FIG. 1, in this non-limiting illustrated embodiment dual-density processed food containing a lower-density portion and a higher-density portion is collected in process or from finished food product (step 1), optionally is frozen or otherwise chilled (step 2) and/or processing air is frozen or chilled (step 3), and then dual-density food is subjected to a selective grinding treatment (step 4), and the resulting selectively ground lower-density portion and unground higher-density portion of the food are separated from each other (step 5), and they are independently made available as "rework" for re-use as food components and ingredients (step 6, and step 7).

In an optional step (step 2), the processed food-product may be prefrozen or otherwise pre-chilled before introduction into the cyclonic processing unit described herein to further inhibit grinding or melting from occurring with respect to the higher-density portion of the processed food. In particular, this optional procedure may be useful in the instances of heat-sensitive higher-density portions, such as chocolate chips and so forth. Exposure of the processed food to chilled or freezing temperature conditions sufficient to cool or freeze any moisture content of the higher-density portion (including ambient water vapor), which in turn renders the higher-density portion even harder, more brittle, and denser when subjected to the selective grinding operation and conditions thereof. This helps to further protect the integrity of the higher-density portion and keep it intact during such selective grinding processing. In one embodiment, the temperature of the dual-density processed feed material (step 2), and/or the processing air (step 3) which will be used in the granulation process, as described in more detail below, is/are cooled to about 40° F. (4.5° C.) or less, and particularly to about 32° F. (0° C.) or less, before introduction into the cyclonic processing unit.

Upon completing step 4, a ground lower-density portion and an unground higher-density portion of the selectively ground food product are obtained which may be separated (e.g., via screening), and each fraction is suitable for use in comestibles. The ground lower-density first portion of the food product obtained may substantially retain its flavor and functional attributes through the grinding treatment. For instance, when the lower-density portion of the dual-density food is a farinaceous material, residual starch content thereof remains after any prior cooking or other thermal treatments are performed on the processed food is substantially maintained through the grinding process according to the present invention, and thus is functionally available for re-use. It also may be re-used at relatively high levels in further food production lines. In one preferred embodiment, the lower density portion may comprise a cooked dough material, such as base cake.

The higher-density portion of the processed food has a density that is greater than that of the lower-density food component of the same processed food. In one embodiment, the higher-density portion of the processed food has a density ranging from about 0.5 to about 1.2 g/$cm^3$, and the lower-density portion has a density ranging from about 0.4 to about 1.0 g/$cm^3$.

The higher-density portion of the food may comprise flavor particles. The term "flavor particles" is used herein to denote particles added to food base for flavoring purposes which remain as discrete, heterogeneous particulates and inclusions in the cooked food product. The term includes, for example, relatively dense edible particulates such as chocolate-containing pieces, butterscotch-containing pieces, caramel-containing pieces, nuts, noncoated confectioneries, candy-coated confectioneries, fruit jellies, dried fruits, fruit pieces, and so forth. For example, chocolate-containing pieces may comprise chocolate drops or chips, or coated-confectioneries such as M&M's®. A higher-density portion of the dual-density food generally tolerates the procedure well without incurring attrition nor melting, while the lower-density food portion may be extensively ground under similar processing conditions within the same process unit. In one embodiment, the higher-density portion of the dual-density processed food product incurs less than about 2 wt. %, more particularly less than about 0.5 wt. %, weight loss of food solid content thereof during the selective grinding process in accordance with the present invention.

The higher-density portion may be a relatively heat-sensitive food material, as may be the situation for some flavoring particles, especially chocolate-containing flavor particles. The heat-sensitive flavor particles may have a melting temperature of about 85 to about 125° F. For instance, chocolate chips used as the higher-density portion may have a melting temperature of about 88 to about 120° F. Thus, the processing conditions are maintained below the melting temperature relative to the chocolate chips or other heat-sensitive higher-density portion. Processing according to the present invention may be performed within a static structure with generally unheated air conditions provided within the process unit during selective grinding of the lower-density portion, but not the higher-density portion, of the processed food being treated.

The recovered or reclaimed components of the processed dual-density food product each may be stably stored until re-used in subsequent food production. The ground and non-ground portions may be used as food ingredients in the same type of processed food production line from which it was collected, or in a different type of processed food production line in which their flavor and/or functional attributes may be desirable or useful.

Figure 2:
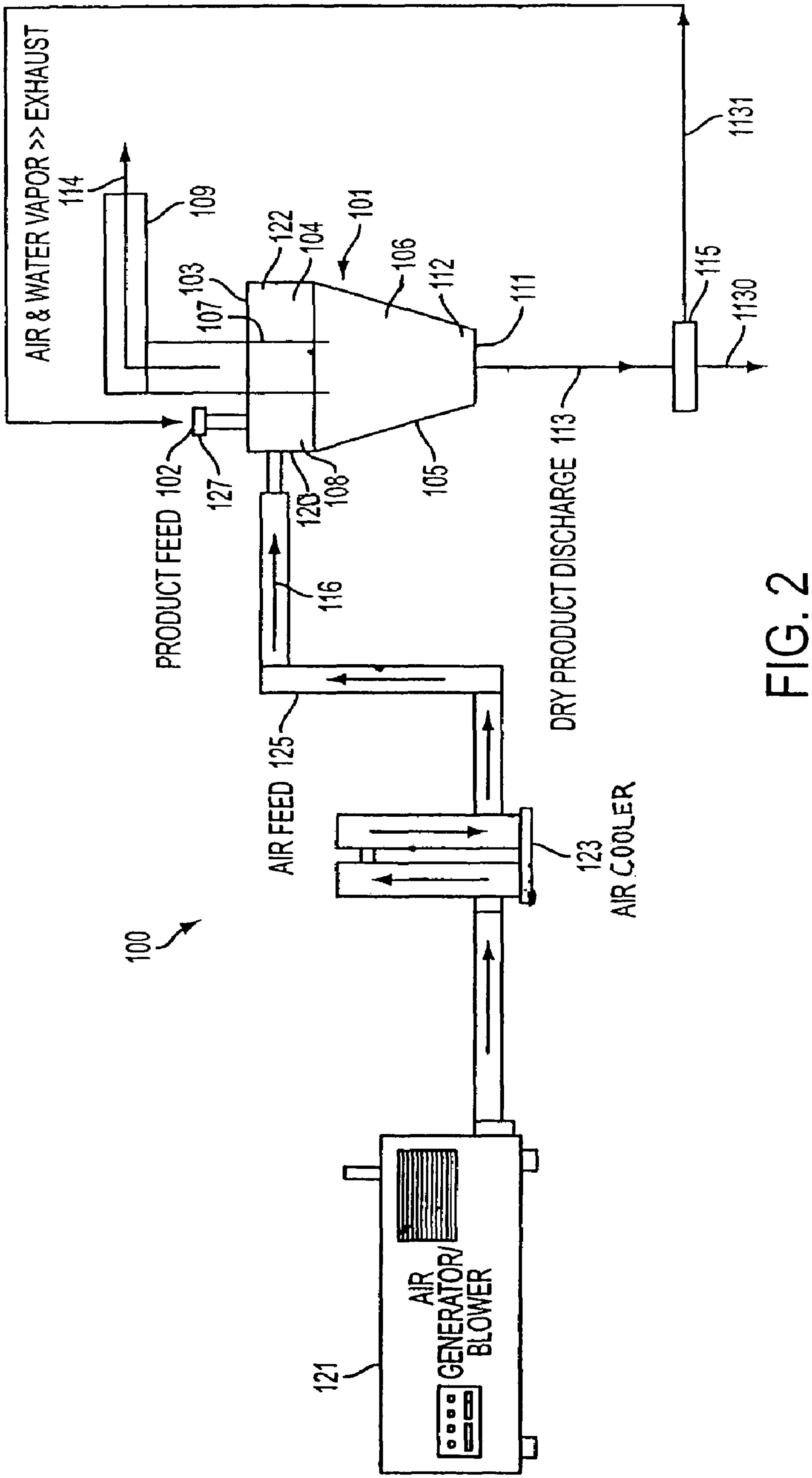
FIG. 2 is a schematic view of a system useful for processing dual-density processed food according to an embodiment of this invention.
Figure 3:
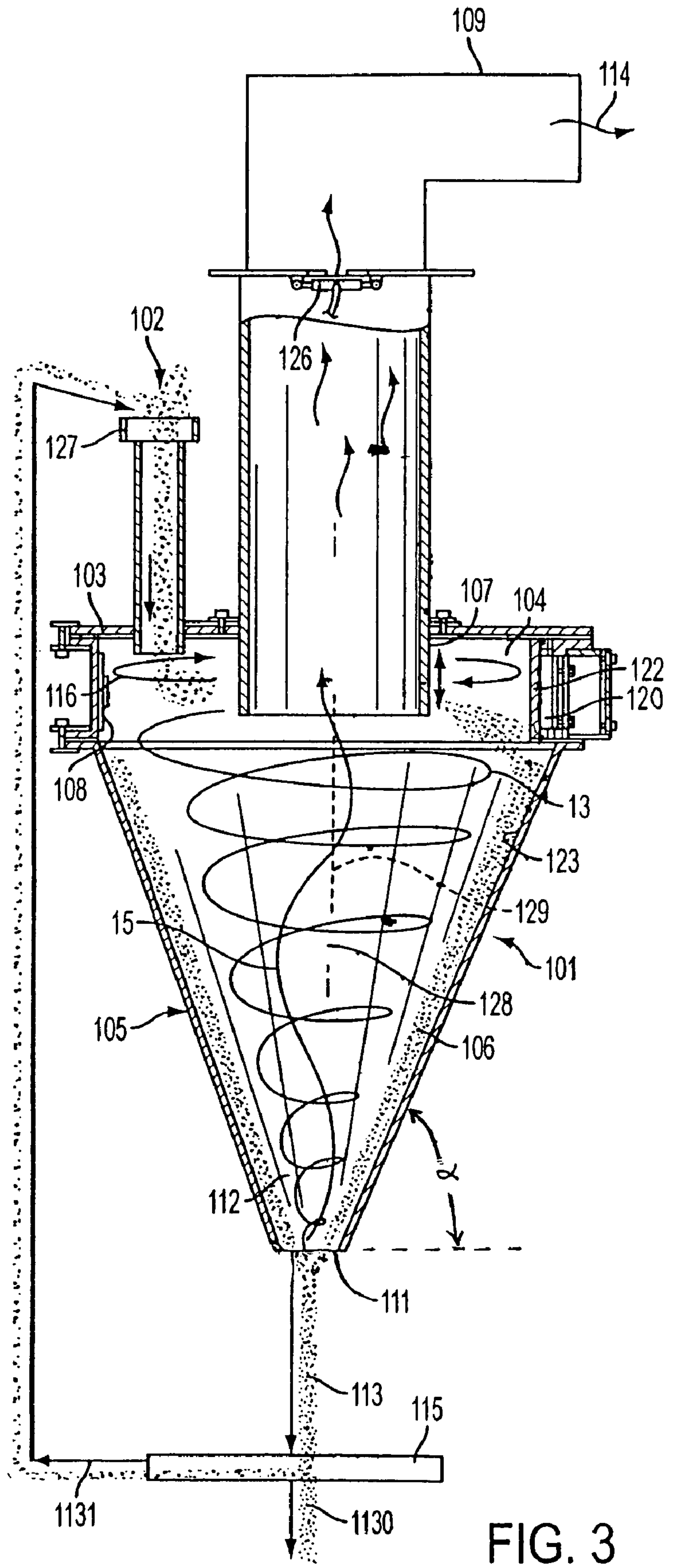
FIG. 3 is a cross sectional view of the cyclone unit used in the processing system illustrated in FIG. 2.

Referring now to FIGS. 2 and 3, details of an exemplary equipment arrangement and process of operating it for conducting the selective grinding of the dual-density processed food in step 4 of FIG. 1 is discussed hereinafter. The dual-density food product that is introduced into the cyclonic system for treatment in the process of this invention may be derived from commercial food manufacture or other sources of dual-density food materials. The dual-density food may be in the form of discrete whole pieces as originally manufactured, or as portions, parts, fragments, shreds, fragments, and so forth thereof.

Referring to FIG. 2, an exemplary system 100 for performing selective grinding of dual-density processed food according to a process embodiment of this invention is shown. Cyclone 101 is a structural enclosure comprised of two fluidly communicating sections: an upper cylindrical enclosure 103 defining a chamber 104; and a lower truncated conical shaped enclosure 105 that defines a cavity 106. Both the upper and lower enclosures are annular structures in which solid wall or shell encloses an interior space. In this illustration, the upper enclosure 103 has a generally uniform cross-sectional diameter, while the lower enclosure 105 tapers inward towards its lower end 112. In a non-limiting embodiment, the taper angle a of lower enclosure 105 may range from about 66 to about 70 degrees. For purposes herein, the terminology "enclosure" means a structure that encloses a chamber, cavity, or space from more than one side.

Compressed air 116 and dual-density processed food 102 are separately introduced into the cyclone 101 at the upper enclosure 103. The processed dual-density processed food is discharged as a solid particulate 113 from opening 111 at the lower end 112 of the cyclone 101. A valve mechanism (not shown), such as a rotary valve or rotary air-lock, optionally may be installed on the lower end 112 of the cyclone. Alternatively, a hollow cylindrical extension shaft (not shown), optionally may be installed on the lower end 112 of the cyclone 101 to help direct granulated product into a receptacle or the like situated below the cyclone. Preferably, product particulate 113 is discharged from opening 111 of the lower end 112, such as through an extension shaft, and without use of an airlock valve mechanism at the lower end 112. In the absence of a valve mechanism at the lower end 112 of the cyclone 101, the pressurized air introduced into the cyclone also will escape from the cyclone 101 via opening 111 at the cyclone's lower end 112. This additional air loss may need to be need to be compensated for in the inlet air feed rate to sustain a desired air pressure condition inside the cyclone, such as by increasing it sufficient to offset air loss occurring from both the bottom of the cyclone as well as the exhaust gas stream 114.

Air, and possibly some small amount of moisture vapor released from the dual-density food during treatment within the cyclone 101, is exhausted as exhaust gases 114 from the cyclone via sleeve 107 and exhaust duct 109. Some nominal amount of light debris may be liberated from the food during their processing in the cyclone and gets eliminated with the exhaust gas stream 114. The exhaust gas stream 114 optionally may be particle filtered, and/or scrubbed to strip out volatile compounds or other compounds, such as using a separate scrubber module, e.g. a packed bed type scrubber, before it is vented to the atmosphere (e.g., see FIG. 4, feature 1141). Sieving device 115 is described in more detail later herein. Generally, it is used to separate the oversize or coarser product 1131, i.e., the unground higher-density portion in particulate product 113 from the lower-density ground portion 1130 of the food product introduced into the cyclone 101.

To introduce the compressed air 116 into cyclone 101, an air pressurizing mechanism 121, such as a blower or air compressor, generates a high volume, high velocity compressed air stream that is conducted via air ducting 125 through a cooling unit 123, and from there is introduced into upper enclosure 103 of cyclone 101. The term "compressed air" refers to air compressed to a pressure above atmospheric pressure, e.g., above 14.7 psia (lb./$inch^2$ absolute). Heating the compressed air before its introduction into the cyclone

101 ordinarily is not desirable or necessary for embodiments herein, although in certain situations, such as described hereinafter, it may be useful. Heating the compressed air generally is undesired as it may induce melting of any heat-sensitive portion of the dual-density food material, e.g., chocolate chips, being processed in the cyclone. In one embodiment, the compressed air is cooled to a temperature below the glass-transition temperature of the heat-sensitive portion of the edible feed material before it is introduced into cyclone 101. In one particular embodiment, the air is cooled to a temperature of about 35 to about 75° F., particularly about 60 to about 70° F. In another embodiment, air may be introduced into the cyclone at ambient temperatures without being heated to the extent the air temperature is below the glass transition temperature of the food sensitive component of the food being processed. That is, if the air temperature of the air as discharged from the compressor 121 is below the glass transition temperature of the food sensitive component of the food being processed, it may not be necessary to conduct the air through air cooler 123 in an operating mode before the air is fed into the cyclone. The ambient air temperature and any air temperature changes associated with compression preferably is monitored before running air without use of the air cooler. The air cooler 123 may be a heat exchanger device. The air cooler 123 may be a commercial or industrial heat exchanger unit, or a refrigeration unit or other suitable cooling device, e.g. a cooling unit capable of reducing the temperature of continuous flow process air to within about 10° F. (about 6° C.) of the coolant temperature.

However, if the dual-density food is moist and does not contain any particularly heat-sensitive components, then air heating may be used to help dehydrate the dual-density food during processing, or otherwise provide added moisture content control or adjustment in the product during processing. For purposes of the following descriptions, the compressed air is unheated, and generally also cooled, although the invention should not be construed as limited thereto.

The compressed air 116 is introduced into chamber 104 substantially tangentially to an inner wall 108 of the upper enclosure 103. This can be done, for example, by directing the air stream 116 to a plurality of holes 120 (e.g., 2 to 8 holes) circumferentially spaced around and provided through the wall 108 of the upper enclosure 103 through which the compressed air stream is introduced. Deflection plates 122 can be mounted on inner wall 108 of upper enclosure 103 for deflecting the incoming stream of compressed air into a direction substantially tangential to the inner wall 108 according to an arrangement that has been described, for example, in U.S. patent application publication no. 2002/0027173 A1, which descriptions are incorporated herein by reference. The compressed air may be introduced into the upper enclosure 103 of cyclone 101 in a counter-clockwise or a clockwise direction.

The introduced air 10 generally may be further pressurized cyclonically in the chamber 104 and cavity 106. Due to the centrifugal forces present in the cyclonic environment, it is thought that the pressure nearer the outer extremities of the cavity 106 is substantially greater than atmospheric pressure, while the pressure nearer the central axis of the cavity 106 is less than atmospheric pressure. As shown in FIG. 3, as a non-limiting illustration, after being introduced into upper enclosure 103, the compressed air 116 spirals or otherwise travels generally along a large downward path as a vortex 13 through the upper enclosure 103 and the lower conical shaped enclosure 105 until it reaches a lower end 112 thereof. In this illustration, near the lower end 112 of the cavity 106 defined by the inner walls 123 of lower enclosure 105, the downward direction of the air movement is reversed, and the air (and any moisture vapor released from the food during treatment within the cyclone 101) whirls back upwardly as a smaller vortex 15 generally inside the larger vortex 13. The smaller vortex 15 flows back up from the lower end 112 of the lower enclosure 105 in a central region 128 located proximately near the central axis 129 of the cyclone 101 and generally inside the larger vortex 13. The smaller vortex 15 flows upward until exiting the enclosure via sleeve 107 and then exhaust duct 109.

A vortex breaking means (not shown) optionally can be interposed below or inside the lower end 112 to encourage the transition of the larger vortex 13 to the smaller vortex 15. Various vortex breaking arrangements for cyclones are known, such as the introduction of a box-shaped enclosure at the bottom of the conical enclosure.

The dual-density processed food 102 is separately introduced into upper enclosure 103. The introduced dual-density processed food drops gravitationally downward into chamber 104 until they become entrained in the ambient or cooled, dehumidified air vortex 13 within cyclone 101. Preferably, the dual-density processed food is introduced into upper enclosure 103 in an orientation such that they will fall into the cyclonic vortex 13 generated within cyclone 101, where located in the space between the sleeve 107, and inner wall 108 of the upper enclosure 103. This feed technique serves to minimize the amount of dual-density processed food that may initially fall into extreme inner or outer radial portions of the vortex where the cyclonic forces that the food experiences may be lower. As indicated, the feed material 102 may be prechilled, or at least a portion of it frozen, before it is introduced into the cyclone 101 by pre-storing or conveying the feed material in or through any suitable chilling device 1020 suitable for that purpose, e.g., such as a commercial or industrial heat exchanger or refrigeration unit.

The entrained food travels in the vortex 13 of air spiraling or otherwise traveling through the lower enclosure 105 until reaching the lower end 112 of the lower enclosure 105. During this downward flow path, the selective grinding effects on the food may occur at different respective times and at different places during the downward flow path of the food through the cyclone. While not desiring to be bound to any theory, it is thought that the pressure-gradient and coriolis forces across, cavitation explosions, and the collision interaction between the food particles entrained in the high-velocity cyclonically pressurized air may be violently disruptive to the physical structure of food product. Alternatively, or in addition thereto, the centrifugal force of the vortex may move the food product forcefully against inner walls 108 and 123 of the enclosure. These modes of attrition, individually or in combination, or other modes of attrition that may occur within the cyclone which may not be fully understood, bring about selective comminuting (grinding) of the lower-density component of the food. This unit 101 requires no mechanical parts for effecting selective grinding of the dual-density food material.

In a further embodiment of the invention, the discharged solid particulate product 113 is screened, such as using a sieve, such as a screen sieve or other suitable particulate separation/classifying mechanism 115, to sort and separate the finer fraction of ground food 1130 which predominantly contains the ground lower-density portion, such as the base cake fraction, in the solid particulate product 113 that have particle sizes meeting a size criterion, such as being less than a predetermined size, which are suitable for post-grinding processing, from the coarser product fraction 1131 which predominantly contains the unground higher-density portion, such as chocolate pieces. The coarser fraction (oversize) 1131 may also include some coarser base cake. A coarser (oversize)

base cake portion of fraction 1133 may be separated from the higher-density pieces 1132, and redirected into the upper enclosure of the cyclone for additional processing therein, as shown by a hatched line. A conveyor (not shown) could be used to mechanically transport the redirected coarse base cake material back to feed introducing means 127 or other introduction means in upper enclosure 103 of cyclone 101. Also, feed introducing means 127 may be an inclined conveyor (e.g., see FIG. 4, feature 1270), which transports dual density feed material from a lower location up to and into chamber 104 of the cyclone 101 at the upper enclosure 103.

It will be appreciated that sleeve 107 can be controllably moved up and down to different vertical positions within cyclone 101. In general, the lower sleeve 107 is spaced relative to the cavity 106, the smaller the combined total volume of the cyclone 101 which is available for air circulation. Since the volume of air being introduced remains constant, this reduction in volume causes a faster flow of air, causing greater cyclonic effect throughout cavity 106 and consequently causing the food to be ground to circulate longer in the chamber 104 and the cavity 106. Raising the sleeve 107 generally has the opposite effect. For a given feed and operating conditions, the vertical position of sleeve 107 can be adjusted to improve process efficiency and yield.

Also, a damper 126 can be provided on exhaust duct 109 to control the volume of air permitted to escape from the central, low-pressure region of cavity 106 into the ambient atmosphere, which can affect the cyclonic velocities and force gradients within cyclone 101. Other than the optional damper, the unit 101 generally requires no moving parts for operation, and particularly with respect to effecting the grinding action which occurs within the unit.

By continually feeding processed food into cyclone 101, a continuous throughput of ground lower-density portion, e.g., base cake, and the liberated substantially intact higher-density portion, e.g., chocolate pieces, are obtained. A non-limiting example of a commercial apparatus that can be operated in a continuous manner while processing food according to processes of this invention is a WINDHEXE apparatus, manufactured by Vortex Dehydration Systems, LLC, Hanover Md., U.S.A. Descriptions of that type of apparatus are set forth in U.S. patent application publication no. 2002/0027173 A1), which descriptions are incorporated in their entirety herein by reference.

The cyclonic system 100 provides mechanical energy to disintegrate and granulate the lower-density portion while liberating the higher-density portion pieces content in substantially intact form as the food product descends through the conical section of the grinder. The food exiting the cyclone 101 exhibits a flowable solid particulate type form including both larger higher-density pieces, and granulated lower-density material, which may be a flour or powdery material.

The processing unit 101 may be left relatively clean and tidy, as the processed food material does not tend to cling as residue to the interior walls of the process unit used to selectively grind the food product. This can facilitate any desired change-over for processing a different type of feed material within the same unit.

In one process scheme for processing dual-density processed food, the introduction of the compressed air into the cyclone comprises supplying compressed air at an inlet pressure within the range of from about 10 psig to about 100 psig, particularly from about 20 psig to about 35 psig, and more particularly from about 26 psig to about 32 psig. The pressure condition may need additional attention for certain higher-density portion materials which can undergo a depression of their glass transition temperature in response to increased pressure conditions. If such glass transition temperature depression may occur in the higher-density portion of the dual-density food material being processed, then care must be taken to control the pressure condition to a low enough value such that the glass transition temperature of the higher-density material does not overlap with the process temperature where distortion of the shape of the higher-density portion could occur. For instance, in the processing of chocolate chip cookies in a three foot diameter cyclone, compressed air introduced at a rate of about 1,000 CFM preferably should be introduced at an inlet pressure of about 26 to about 32 psig to assure the desired selective granulation is achieved on the base cake without damaging or melting the chip inclusions.

The compressed air fed into the cyclone generally should not be permitted to have a temperature above the glass transition temperature of inclusions of the dual-density feed material. As noted above, heated air increases the risk of inducing some undesired melting of heat-sensitive components of the food. The volumetric introduction rate of the compressed air into the cyclone is within the range of from about 500 to about cubic feet per minute (CFM) to about 10,000 CFM, particularly from about 1,000 CFM to about 6,000 CFM, and more particularly from about 1,500 CFM to about 3,000 CFM.

The feed rate of the dual-density processed food can vary, but generally may be in the range of about 1 to about 300 pounds per minute, particularly about 50 to about 150 lbs./min., for about a 1 to about a 10 foot diameter (maximum) cyclone. The cyclone diameter may be, for example, from about 1 to about 10 feet in diameter, and particularly about 1 to about 6 feet in diameter.

The dual-density processed food may be processed within the above-noted cyclone arrangement within a short period of time. In one embodiment, upon introducing the dual-density processed food into the cyclone, a granulated product thereof is discharged from the processing unit within about 15 seconds, and particularly within about 1 to about 5 seconds. Volatile components also may be handled by conducting the cyclone exhaust through a scrubber unit and the like after it exits the cyclone unit.

Substantially all the introduced dual-density processed food may be discharged as processed product within such a short period of time. The above-noted processing temperatures and durations applied during grinding of the dual-density processed food generally are low enough to help prevent any significant undesired changes in the starch structure, or other physico-chemical attributes relevant to food-processing, from occurring during the grinding treatment such as described herein. Any starch content present in the dual-density food (before granulation) is preserved substantially intact through the grinding treatment performed in accordance with this invention on the dual-density processed food. Conventional milling generally employs moving parts to effect attrition of a material, which tends to generate localized heat. Intense or unduly elevated heat may increase the risk of degradation of desirable food functional features, and/or melt heat-sensitive components.

In one embodiment, the dual-density processed food used as the feed material of a grinding process comprises a relatively low-moisture material containing less than about 14 wt. % moisture, and generally from about 1 wt. % to about 14 wt. % moisture when introduced into the cyclone 101 of system 100. Feed material at higher moisture levels may also be used to the extent it does not agglomerate or build-up into a sticky or pasty mass inside the cyclone or otherwise become non-processable. The compressed air fed into the cyclone usually is unheated, or at least is not heated to a temperature that closely approximates or exceeds a glass transition temperature of any component of the dual-density material being processed. In one embodiment, the dual-density material is processed at a cooled or at least a nonheated temperature, such as at a temperature about 65 to about 75° F. (about 18 to about 24° C.), or lower temperatures. The ground (granulated) portion and unground portion of the food product obtained from the process generally contains about 1 wt. % to about 14 wt. % moisture content.

It may be necessary to dehumidify the compressed air before it is introduced into the cyclone unit in high relative humidity (RH) conditions (e.g. RH greater than about 50%) to ensure that the feed material can be attrited into granular form and does not build-up into a sticky or pasty mass inside the cyclone. The air may be dehumidified using a conventional cooling coil unit or similar device used for dehumidification of process air (e.g., see FIG. 4, feature 1231). The dehumidifier or air dryer 1231 may be a commercial unit for the general purpose, e.g., a Model MDX 1000 air dryer from Motivair, Amherst, N.J.

Figure 4:
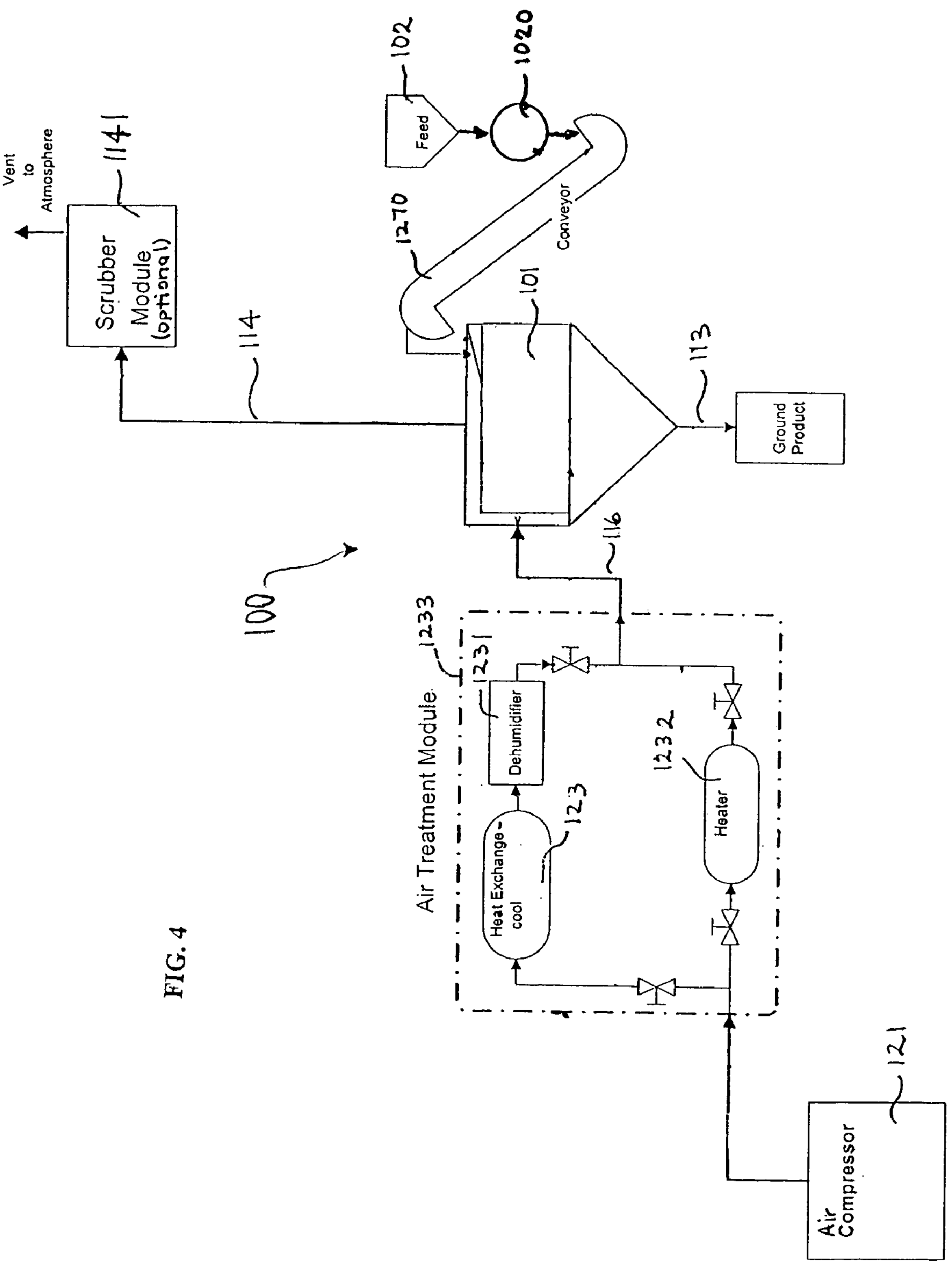
FIG. 4 is a schematic view of a system useful for processing dual-density processed food according to another embodiment of this invention.

However, under certain conditions, higher moisture content dual-density processed food also may be used as the feed material and can be processed in accordance with the desired results. For example, if higher-density flavoring particles are being reclaimed from the food product which have relatively higher melting temperatures, such as nuts, the compressed air fed into the cyclone may be heated in an air heater 1232 to induce some dehydration of the dual-density feed material while it is being selectively ground in the same process unit (see FIG. 4). The heat exchanger (cooler) 123, dehumidifier 1231 and heater 1232 are units of the subsystem represented as the air treatment module 1233 in FIG. 4. As indicated in FIG. 4, control valves and the like may be used to selectively control and manage air flow through the various air treatment units in module 1233. For purposes herein, the term "heated air" refers to air heated to a temperature above ambient temperature, e.g., above 75° F. (24° C.). The term "compressed heated air" refers to air having both characteristics as defined herein.

Ground lower-density food product obtained by the selective grinding process preferably has commercially useful particle sizes. In one embodiment, the dried, ground lower-density food product obtained by processing dual-density processed food according to an embodiment of this invention generally may have an average particle size of about 1 micron to about 1,000 microns. In one embodiment, the solid particulate product obtained as the bottoms of the cyclone comprise at least about 50% ground lower-density food product having an average particle size of about 1 micron to about 1,000 microns.

The granular food product obtained in accordance with embodiments of this invention is edible and may be used in a wide variety of foodstuffs for a variety of purposes. The granulated food product preferably does not have an unpleasant taste or odor, and may be easily processed with doughs, meats, processed meats, and other processed foods without loss of quality. For example, the granulated food product of embodiments of this invention serves as an economical replacement for original ingredients used in such food products. The granulated food product has ability to contribute flavor and function without adversely impacting such food products. The granulated food product obtained generally is shelf stable, and may be used to impart flavor and/or functional properties to a food product being manufactured after many months of storage of the granulated food product, such as up to about twelve months storage/shelf life or more.

The dual-density processed food that can be used as the feed material in the process of this invention can be derived from commercial food manufacture or other sources of dual-density processed food.

In some preferred embodiments, the dual-density processed food subjected to the single-stage selective grinding treatment comprises a dual-density processed food containing a lower-density portion comprising a grain-based ingredient. The grain-based ingredient may include one or more principal parts of cereal grain, such as the pericarp or bran (external layer of grain), the endosperm (farinaceous albumen containing starch), or the germ (seed embryo). Examples are cereal grains, meals, flours, starches, or glutens, obtained from grinding cereal grains, such as wheat, corn, oats, barley, rice, rye, sorghum, milo, rape seed, legumes, soy beans, and mixtures thereof, as well as various milling foods of such cereal grains, such as bran. In one embodiment, the dual-density processed food generally may contain, on a dry basis, about 1 to about 99 wt. %, and particularly about 5 to about 95 wt % grain-based ingredient, and the remainder may be comprised of higher-density, non-grain based food materials.

In one embodiment, the grain-based ingredient comprises a farinaceous material, and particularly a farinaceous material obtained or derived from cereal grain(s). Farinaceous materials include the above-noted cereal grains, meals or flours, as well as tuberous foodstuffs, such as potatoes, tapioca, or the like, and flours thereof. These starch-containing materials can be processed according to this invention without incurring undue gelatinization or other undesirable changes. The grinding unit described herein permits relatively short duration, low temperature processing to be used, which is thought to help inhibit and avoid starch transformations.

The dual-density processed foods containing a grain-based ingredient may be selected, for example, from dual-density dough-based foods. In one embodiment, these dual density dough-based foods are derived from substantially or fully cooked processed food products and/or physical pieces thereof. Such dual density dough-based foods may be, for example, cookies, ready-to-eat (RTE) cereals or cereal bars, or other snacks or baked goods, and so forth. The dual-density foods thereof may be collected as part of food manufacture processing performed on finished food products.

In one embodiment, for example, dual-density dough-based foods collected from a processed food production line may be selectively ground in a grinding procedure in accordance with an embodiment of this invention to yield a re-usable food grade granular product of base cake and substantially intact higher-density flavoring particles, such as chocolate-containing pieces. For example, where chocolate chip cookies are the processed food material which is selectively ground according to an embodiment of this invention, the granular base cake product substantially retains any starch structure remaining after any cooking of the processed food, such that it is still suitable for a fresh dough making. It may provide at least in part a stable functional substitute for fresh dough ingredients such as flour.

In a particular embodiment, dual-density cookies which may be selectively ground may be prepared from flour, sugar, fat or shortening leavening, and relatively dense flavoring particles. For instance, chocolate chip cookies may include a lower-density base cake prepared from flour, sugar, and fat; and separately higher-density solid flavor pieces (e, chocolate chips) dispersed in the base cake. The ingredients are combined and blended in a suitable blending apparatus. After the dough is formed, higher-density flavor particles, such as chocolate pieces, nuts, butterscotch chips, caramel chips, and so forth, may be admixed to uniformly distribute the flavor particles throughout the dough. The dough is conducted through a suitable shaping and forming apparatus to form dough pieces. The dense flavor particles alternatively or additionally may be applied to a surface portion of the dough. As commercial production methods for making such cookies, reference is made, for instance, to U.S. Pat. No. 5,071,668 (Nabisco Brands), which descriptions are incorporated herein by reference for all purposes.

The higher-density portions, such as chocolate pieces and/or nuts, which are reclaimed substantially intact from the dual-density dough-based foods according to an embodiment of this invention may be re-used in food production. The free-flowing granulated base cake product obtained from dual-density dough-based foods processed in this manner may be used as a replacement for fresh dough ingredients in a food production line at substantially unrestricted levels. In one embodiment, the granulated base cake product reclaimed from dual-density dough-based products may be used at levels of 0.1 wt % or more, and more particularly about 1 to about 99 wt %, in place of fresh flour in a cookie dough batch. The dual-density product processed according to embodiments herein also may be other food products and materials such as comprises RTE cereal bars, snack mixes, and trail mixes, which contain two or more categories of components having different respective densities.

The Examples that follow are intended to illustrate, and not limit, the invention. All percentages are by weight, unless indicated otherwise.

EXAMPLES

Example 1

Nabisco Chips® Ahoy! chocolate chip cookies (approx. 3 wt. % moisture) were fed into a WINDHEXE apparatus for circular vortex air-flow material grinding. The WINDHEXE apparatus was manufactured by Vortex Dehydration Systems, LLC, Hanover, Md., U.S.A. The basic configuration of that type of apparatus is described in U.S. patent application publication no. 2002/0027173 A1, and reference is made thereto. The process unit had two inlet ports equidistantly spaced around the upper portion of the apparatus through which the compressed air stream was concurrently introduced in a counter-clockwise direction.

A three-foot diameter WINDHEXE apparatus was tested. The diameter size refers to the chamber size of the enclosure into which air and dual-density processed food introductions were made. The conditions of this experiment are described below. The feed rate of the cookies was set for an approximate discharge of five pounds solid product per minute, and approximately 65 pounds of food material was tested in the apparatus. The dual-density processed food was loaded into a hopper that directly fed onto a three-inch belt conveyor that fed into the WINDHEXE apparatus. Testing was performed in the three-foot diameter WINDHEXE apparatus with unheated compressed air introduced at 65-75° F., an air introduction rate of 1,000 cubic feet per minute (cfm) and pressure of 20-35 psig.

A food product exiting the apparatus included intact (non-melted) chocolate chips, and base cake in finely-ground form. This combination food product was discharged from the bottom of the cyclone in about two seconds after the cookies had been introduced into the processing unit. The chocolate chips were separated from the base cake by screening (#3 mesh size). The granulated base cake obtained had an average particle size of about 5 to about 50 microns, and a moisture content of about 3.0%. Both the reclaimed chocolate chips and the granular base cake were shelf stable, well-retained flavor through the treatment. The chocolate chips were recovered in substantially physically intact condition as compared to their original shape before processing. For example, the chips displayed no occurrence of melting or significant physical attrition from the processing. They both were functionally suitable for re-use as a cookie or other baked good ingredients, such as in a similar cookie production line from which the base cake and chip ingredients were originally used. It further will be appreciated that either the granulated base cake or recovered chocolate chips also may be useful in different food production lines.

Additional studies have shown that feed rate and air temperature variation may be used to control the base cake granulation and moisture content.

Example 2

Nabisco Chips® Ahoy! chocolate chip cookies (approx. 3 wt. % moisture) were fed into a WINDHEXE apparatus for circular vortex air-flow material grinding using equipment an under conditions similar to Example 1. The cyclone enclosure was left open to the atmosphere at its lower end where granular product was discharged (i.e., no rotary valve or similar mechanism was installed on the lower end of the cyclone). The granular product was sieved as in Example 1 to separate intact chocolate chips from the ground base cake obtained. Several batches of chocolate chip cookies were prepared which contained varying respective proportions of the ground base cake (i.e., "meal rework") and/or intact chocolate chips (i.e., "chip rework") recovered from the above-described vortex processing, as re-work in additional chocolate cookie production.

As a control run (Batch C1), a chocolate cookie dough containing no meal rework nor chip rework was prepared. This dough was prepared in a conventional manner in a dough forming stage with the following general formulation:

| Dough Ingredient | Amount (lbs.) |
|---|---|
| wheat flour | 100 |
| granulated sugar | 20-60 |
| salt | 0.5-2.0 |
| sodium bicarbonate | 0.25-2.0 |
| vegetable oil | 20-60 |
| whey | 0.25-8.0 |
| corn syrup | 0.25-12 |
| ammonium bicarbonate | 0.25-2.0 |
| dibasic ammonium phosphate | 0.25-2.0 |
| water | 8-30 |
| chocolate drops | 40-100 |

The cookie dough ingredients were thoroughly mixed to form dough, proofed, and wire cut into individual dough pieces having generally circular profiles and weighing approximately 113 to 123 g per ten pieces. The cookies were baked for approximately 6 minutes in an air impingement oven through which they were conveyed. The temperature of the baking chamber ranged from between 350 to 450° F.

The baked chocolate chip cookies, upon cooling to room temperature had a moisture content of approximately 3%, and weighed approximately 103 to 114 g per 10 pieces.

Four additional cookie dough batches, Batches 1-4, were prepared, which additionally contained different amounts of the meal rework and the chip rework. Otherwise the dough formulations used in Batches 1-4 remained the same as that described above for Control Batch C1. Batch 1 was prepared from dough that further included 2.5 lbs. (about 0.9%) meal rework. Batch 2 was prepared from dough that further included 5 lbs. (about 1.9%) meal rework. Batch 3 was prepared from dough that further included 7.5 lbs. (about 2.8%) meal rework. Batch 4 was prepared from dough that further included 5 lbs. (about 1.8%) meal rework and 4.5 lbs. (1.7%) chip rework.

Chocolate chip cookies were prepared from each of Batches 1-4 using similar dough preparation and baking protocol as that described above for the Control Batch C1. The dough of each of Batches 1-4 machined well and processed essentially the same as the control formulation. Table 1 below summarizes the average dry weight, moisture content, Hunter Color, stack height, and diameter of the finished baked cookies made from the control batch and the batches containing rework. In Table 1, the weight and stack heights were measured and recorded based on ten (10) finished cookie pieces of each batch.

TABLE 1

| Batch | Dry Weight (g) | Moisture (%) | Hunter Color | Stack Height (inch) | Diameter (inch) |
|---|---|---|---|---|---|
| C1 | 114 | 3.0 | 37.52 | 3.7 | 2.0 |
| 1 | 114 | 2.6 | 35.38 | 3.2 | 2.0 |
| 2 | 105 | 2.8 | 34.33 | 3.3 | 1.9 |
| 3 | 106 | 3.3 | 33.53 | 3.4 | 2.0 |
| 4 | 107 | 3.1 | 33.51 | 3.6 | 1.9 |

While the invention has been particularly described with specific reference to particular process and product embodiments, it will be appreciated that various alterations, modifications and adaptations may be based on the present disclosure, and are intended to be within the spirit and scope of the present invention as defined by the following claims.

What is claimed is:

1. A selective granulation process for dual-density processed food, comprising:

introducing compressed air into an enclosure that includes a truncated conical shaped section, wherein the introduced air travels along a downward path through the enclosure, including the conical section, to a lower end thereof, and the air reaching the lower end flows back up and exits the enclosure via an exhaust outlet and wherein the introducing of the compressed air comprises supplying compressed air at a temperature of about 35° F. to about 75° F.;

introducing into the enclosure dual-density processed food comprising a lower-density portion having a first density and a higher-density portion having a second density which is greater than the first density, wherein the dual-density processed food is entrained in the introduced air traveling downward through the enclosure, and wherein the lower-density portion of the dual-density processed food is ground before reaching the lower end of the enclosure and the higher-density portion reaches the lower end of the enclosure substantially unground;

discharging the ground lower-density portion, and the unground higher-density portion, of the food from the lower end of the enclosure.

2. The process of claim 1, wherein the higher-density portion has a density ranging from about 0.5 to about 1.2 g/cm$^3$, and the lower-density portion has a density ranging from about 0.4 to about 1.0 g/cm$^3$.

3. The process of claim 1, further comprising freezing the dual-density processed food before introducing the dual-density processed food into the enclosure.

4. The process of claim 1, wherein the lower-density portion comprises cooked dough and the higher-density portion comprises flavoring particles.

5. The process of claim 4, wherein flavoring particles are selected from the group consisting of chocolate-containing pieces, butterscotch-containing pieces, caramel-containing pieces, nuts, noncoated confectioneries, candy-coated confectioneries, fruit jellies, dried fruits, and fruit pieces.

6. The process of claim 4, wherein flavoring particles comprise chocolate chips.

7. The process of claim 4, wherein the flavoring particles comprise nut pieces.

8. The process of claim 1, wherein the dual-density processed food comprises chocolate chip cookies.

9. The process of claim 1, wherein the higher-density portion has a melting temperature of about 85 to about 125° F.

10. The process of claim 1, wherein the dual-density processed food comprises cookies, cereal, or snack bars.

11. The process of claim 1, wherein the dual-density processed food is RTE cereal bars, snack mixes, or trail mixes.

12. The process of claim 1, wherein the dual-density processed food contains less than 14 wt. % moisture as introduced into the enclosure.

13. The process of claim 1, wherein the ground lower-density portion has an average particle size of about 1 micron to about 1,000 microns.

14. The process of claim 1, wherein the ground lower-density portion comprises at least about 50% ground food product having an average particle size of about 1 micron to about 1,000 microns.

15. The process of claim 1, wherein the lower-density portion of the dual-density processed food comprises a grain-based ingredient.

16. The process of claim 15, wherein the lower-density portion comprises, on a dry basis, about 1 to about 99 wt. % grain-based ingredient.

17. The process of claim 15, wherein the lower-density portion comprises farinaceous material.

18. The process of claim 1, wherein the introducing of the compressed air comprises supplying compressed air at a pressure within the range of from about 10 psig to about 100 psig.

19. The process of claim 1, wherein the introducing of the compressed air comprises supplying compressed air at a pressure within the range of from about 26 psig to about 32 psig.

20. The process of claim 1, wherein the introducing of the compressed air comprises (a) compressing ambient air which is at a first temperature exceeding about 75° F. before compression, (b) cooling the compressed air to a second temperature, lower than the first temperature, which is about 35° F. to about 75° F., and feeding the cooled compressed air into the enclosure.

21. The process of claim 20, wherein the introducing of the compressed air comprises supplying compressed air at a pressure within the range of from about 26 psig to about 32 psig.

22. The process of claim 1, wherein the introducing of the compressed air comprises supplying the compressed air at a rate of within the range of from about 500 cubic feet per minute to about 10,000 cubic feet per minute.

23. The process of claim 1, wherein the introducing of the compressed air comprises supplying the compressed air at a rate within the range of from about 1,500 cubic feet per minute to about 3,000 cubic feet per minute.

24. The process of claim 1, wherein the introducing of the compressed air into the upper cylindrical enclosure occurs in a direction oriented generally tangentially to inner walls of the cylindrical enclosure.

25. The process of claim 1, wherein the upper cylindrical enclosure has a substantially constant diameter of about 1 to about 10 feet, and the lower enclosure comprises a truncated conical shape having a maximum diameter size where the lower enclosure adjoins the cylindrical enclosure and the maximum diameter of the lower enclosure is substantially the same as the diameter of the cylindrical enclosure.

26. The process of claim 1, wherein the lower end of the enclosure is open to the atmosphere.

27. The process of claim 1, further comprising dehumidifying the compressed air to below 50% relative humidity before introducing the compressed air into the enclosure.

28. A process for reworking dual-density processed food in processed food manufacture, comprising:

introducing compressed air into an enclosure that includes a truncated conical shaped section, wherein the introduced air spirals along a downward path through the enclosure, including the conical section, to a lower end thereof, and the air reaching the lower end flows back up and exits the enclosure via an exhaust outlet and wherein the introducing of the compressed air further comprises supplying compressed air at a temperature of about 35° F. to about 75° F.;

introducing into the enclosure dual-density processed food comprising a lower-density portion having a first density and a higher-density portion having a second density which is greater than the first density, wherein the dual-density processed food is entrained in the introduced air traveling downward through the enclosure, and wherein the lower-density portion of the dual-density processed food is ground before reaching the lower end of the enclosure and the higher-density portion reaches the lower end of the enclosure substantially unground;

discharging the ground lower-density portion, and the unground higher-density portion, of the food from the lower end of the enclosure;

combining at least part of the ground lower-density portion or unground higher-density portion and at least one different processed food ingredient; and preparing a processed food product therewith.

* * * * *

UNITED STATES PATENT AND TRADEMARK OFFICE

CERTIFICATE OF CORRECTION

PATENT NO. : 7,445,806 B2
APPLICATION NO. : 10/932295
DATED : November 4, 2008
INVENTOR(S) : Shah et al.

It is certified that error appears in the above-identified patent and that said Letters Patent is hereby corrected as shown below:

In Col. 16, Line 62, Claim 22, delete “rate of” and insert -- rate --.

Signed and Sealed this

Seventeenth Day of February, 2009

JOHN DOLL
*Acting Director of the United States Patent and Trademark Office*